United States Patent
Kreuzer et al.

[11] Patent Number: 6,076,850
[45] Date of Patent: Jun. 20, 2000

[54] AIRBAG WITH GAS GENERATOR

[75] Inventors: Martin Kreuzer, Kleinwallstadt; Reinhold Kehle, Bessenbach; Norbert Heeg, Babenhausen, all of Germany

[73] Assignee: TRW Automotive Safety Systems GmbH, Germany

[21] Appl. No.: 09/036,046

[22] Filed: Mar. 6, 1998

[30] Foreign Application Priority Data

Mar. 12, 1997 [DE] Germany .............................. 197 10 063

[51] Int. Cl.[7] .................................................. B60R 21/16
[52] U.S. Cl. ..................................... 280/728.2; 280/743.1
[58] Field of Search ................................ 280/733, 728.2, 280/728.1, 741, 743.1, 730.2

[56] References Cited

U.S. PATENT DOCUMENTS

| | | | |
|---|---|---|---|
| 4,944,527 | 7/1990 | Bishop et al. | 280/741 |
| 4,964,654 | 10/1990 | Bishop et al. | 280/728.2 |
| 5,310,216 | 5/1994 | Wehner et al. | 280/743 R |
| 5,423,273 | 6/1995 | Hawthorn et al. | 112/441 |
| 5,498,030 | 3/1996 | Hill et al. | 280/743.1 |
| 5,516,146 | 5/1996 | Kopitzke | 280/728.2 |
| 5,613,704 | 3/1997 | White et al. | 280/740 |
| 5,664,805 | 9/1997 | Yoshida et al. | 280/743.1 |
| 5,687,988 | 11/1997 | Storey et al. | 280/728.2 |
| 5,799,974 | 9/1998 | Honda | 280/739 |
| 5,854,441 | 12/1998 | Metzger | 280/741 |
| 5,855,393 | 1/1999 | Keshavaraj | 280/743.1 |
| 5,857,696 | 1/1999 | Inoue et al. | 280/728.2 |

FOREIGN PATENT DOCUMENTS

| | | |
|---|---|---|
| 43 43 278 A1 | 6/1994 | Germany . |
| 4343278 | 6/1994 | Germany . |
| 44 31 718 A1 | 3/1996 | Germany . |
| 4431718 | 3/1996 | Germany . |
| 195 28 970 A1 | 4/1996 | Germany . |
| 19528970 | 4/1996 | Germany . |
| 0948311 | 2/1997 | Japan . |
| 1029489 | 2/1998 | Japan . |
| 1053081 | 2/1998 | Japan . |
| 2 268 124 | 1/1994 | United Kingdom . |
| 2268124 | 1/1994 | United Kingdom . |

*Primary Examiner*—Paul N. Dickson
*Attorney, Agent, or Firm*—Chadbourne & Parke LLP

[57] ABSTRACT

In a device with a gas generator and an airbag for protecting passengers in the event of an accident, the gas generator is accommodated inside an airbag that is essentially closed all the way around by a seam along the edge. Material and manufacturing costs are considerably reduced in that separately fastening the airbag to the gas generator is unnecessary and in that the two components can be fastened together while the resulting module is being fastened to the inside of the vehicle or to a separate housing.

3 Claims, 3 Drawing Sheets ion, in particular in order that the introduction of further improvements in passive safety strategies within the vehicle will not be prevented by the high costs of installing separate airbags for the driver and passenger.

AIRBAG WITH GAS GENERATOR

BACKGROUND OF THE INVENTION

The present invention concerns a device with a gas generator and an airbag for protecting passengers in the event of an accident.

The folded-up airbag in conventional devices of this type are often fastened to the outside of the gas generator. The gas generator itself is designed to be fastened where installed to the inside of the vehicle either directly or by means of fasteners. The airbag and gas generator in other versions are accommodated in a housing that is itself fastened in place. The airbag can be fastened to the gas generator or housing at several points. Alternatively, the airbag or an airbag holder can be wrapped in a flexible tube. In the latter case, the securing forces are uniformly transmitted when the airbag ignites, and there is no need to destroy a number of fastening points.

An airbag with a continuous seam all the way around it is known from U.S. Pat. No. 5,310,216. Two one-piece fastening straps are wrapped around a cylindrical gas generator and overlap each other at each end. Several mutually aligned holes are in alignment with fastening bolts on the gas generator and the holes and bolts secure the airbag in place. Such fasteners are also located at specific points and lead to local load peaks when the airbag ignited, where the straps can rip apart. Such a device is also very complicated to manufacture due to the many fastening points.

This known device accordingly does not satisfy current concepts for airbag modules, which address efficient manufacture from every aspect in particular in order that the introduction of further improvements in passive safety strategies within the vehicle will not be prevented by the high costs of installing separate airbags for the driver and passenger.

SUMMARY OF THE INVENTION

The object of the present invention is accordingly to improve the generic device to the extent that unreduced safety can be achieved at an acceptable cost, meaning that the airbag module will be as simple in design and as inexpensive to manufacture as possible.

This object is attained in a device of the aforesaid genus in accordance with the present invention in that the gas generator is accommodated inside an airbag that is essentially closed all the way around by a seam along the edge.

One advantage of this approach is that the gas generator and airbag can be integrated into a single assembly by the seam that is in any case necessary. Such an assembly will be easy to handle and can be designed for installation as a whole in a housing or space inside the vehicle. The conventional fastening of the airbag to the gas generator can be eliminated, resulting in considerable savings in manufacturing costs.

Another advantage is that the airbag can be fastened in place along with the gas generator as the latter is installed in the housing or space, and in conformity with the material it is made of, over its whole area, that is, and not only at specific points. No fasteners will have to be destroyed at those points when the airbag ignites.

Only the line for igniting the airbag needs to extend out of the otherwise entirely enclosed airbag through the seam that extends along its edge.

The gas generator in one embodiment of the present invention is attached to a sheetmetal holder that is entirely inside the airbag and has a flange that extends between the ends of the airbag, which are stacked one against another and fastened together at their edges. Two or more mutually aligned holes in the ends of the airbag and in the flange accommodate a screw or similar fastener, It will be clear that the airbag will be stretched over its total area between the holder on the inside and components of the vehicle on the outside once the sheetmetal holder has been screwed with the gas generator accommodated inside it to one of those components (the inner surface of the vehicle or a housing).

Advantageous embodiments and versions of the present invention include the holder being secured in place inside the airbag by the holes and by the seam that extends along the edge, the gas generator being essentially cylindrical and the holder partly surrounds and secures it axially and it is connected to the holder by a clamp, the gas generator being shaped like a pot and having a flange and fastened by a holder inside the airbag and by two or more mutually aligned holes in the flange, the holder, and the airbag for accommodating fasteners, at least some of the edge of the holder being bent curving in toward the inside of the airbag, the module comprising the gas generator and the airbag being accommodated in a housing that has a burst-off lid, wherein the housing has mutually aligned holes for accommodating screws, wherein the ignition line extends out through an opening in the housing, and wherein the gas generator, the airbag, and the housing with its lid comprise an independent assembly, the lid being clipped to the edge of the pot-shaped housing and bursting apart along a score, a connector both inside and outside the airbag for connecting the airbag to the gas generator and for fastening the module composed of the airbag and gas generator to the inside of a vehicle, whereby the connector and the airbag have mutually aligned holes for accommodating fasteners, a mounting plate outside the airbag, a holder inside the airbag that accommodates a cylindrical gas generator and wherein the holder, the airbag, and the mounting plate have mutually aligned holes that can accommodate fasteners and the folded-together airbag being surrounded by a protective cover fastened to the mounting plate and wherein the cover and the mounting plate comprise an independent assembly. These embodiments will now be specified with reference to the drawings, wherein

DETAILED DESCRIPTION OF THE INVENTION

Figure 1:
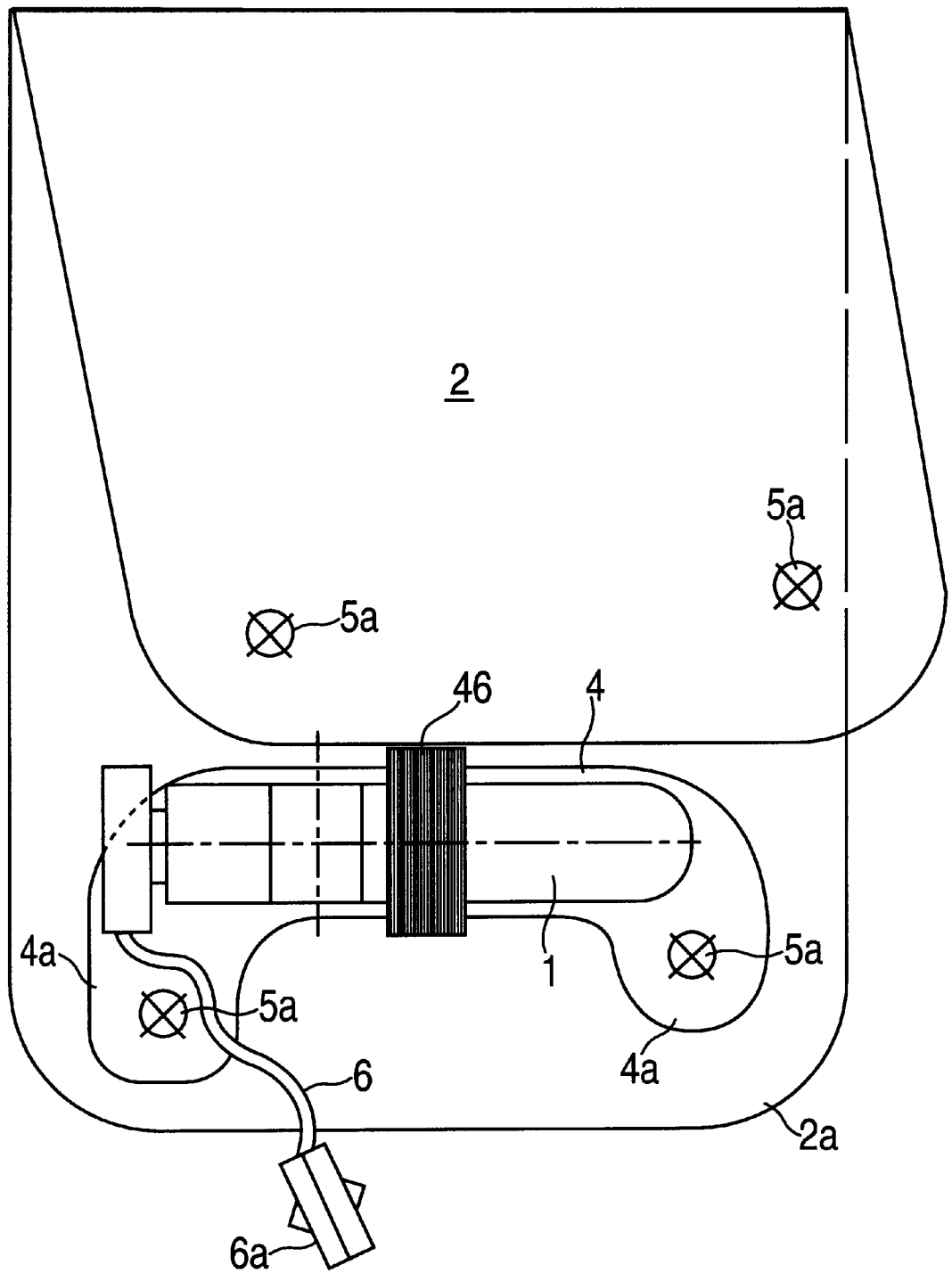
FIG. 1 is a highly schematic view of a half-finished airbag module in accordance with the present invention, FIG. 2 a view of the airbag module illustrated in FIG. 1 once the seam extending along its edge has been produced, FIG. 3 a larger-scale section through part of the airbag module illustrated in FIG. 2, FIG. 4 a section through another embodiment of the present invention, and FIG. 5 a section through a third embodiment.
Figures 2, 3:
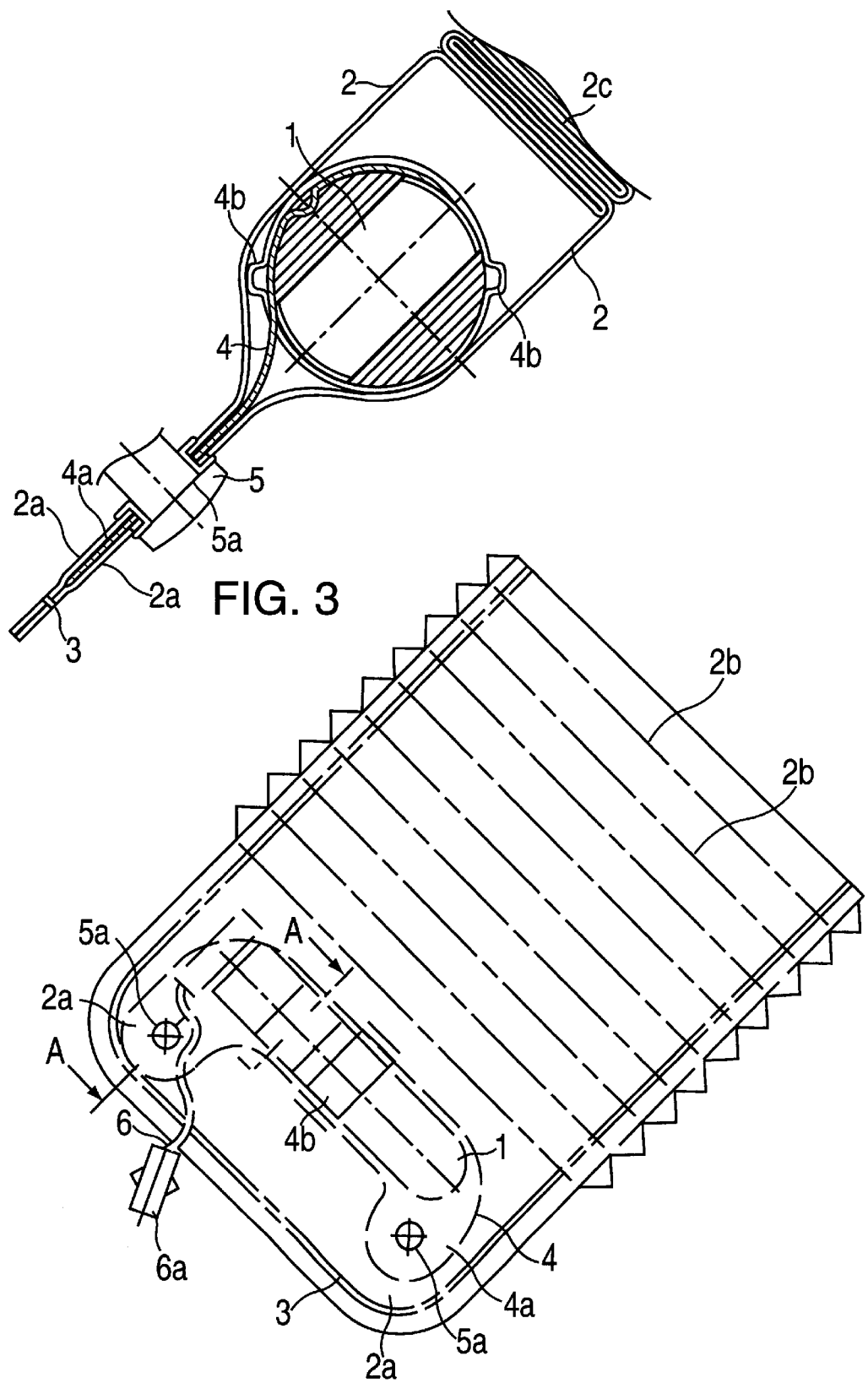

The blank for the embodiment of an airbag 2 illustrated in FIG. 1 is oblong and rectangular. It has been folded at the middle although its two halves have not yet been brought together coinciding. Resting on the bottom half is a sheetmetal holder 4. The holder, the upper half, and the bottom half are all provided with corresponding holes 5a that will accommodate screws or similar fasteners when the module has been assembled as illustrated in FIG. 3. Holes 5a are located in the ends 2a of airbag 2 and in flanges 4a on holder 4. A cylindrical gas generator 1 is secured to holder 4 by a clamp 4b. An ignition line 6 extends from gas generator 1 to a plug 6a beyond the edge of the blank.

FIG. 2 shows a seam 3 along the edge of the airbag illustrated in FIG. 1. Holder 4 and gas generator 1 are now permanently accommodated in airbag 2, which is closed all the way around, with only ignition line 6 extending out. Also indicated in the figure are the flanges 4a on holder 4 and the clamp 4b that secures gas generator 1 to the holder. The holes 5a in the upper and lower halves of airbag 2 are now mutually aligned and in alignment with the holes 5a in flanges 4a. Also evident are the lines along which airbag 2 is folded into a state convenient for stowing.

FIG. 3 is a section along the line A—A in FIG. 2, illustrating in particular how the ends 2a of airbag 2 are folded together with the flanges 4a on holder 4 between them such that a screw 5 or similar fastener can be introduced through the aligned holes 5a in airbag 2 and holder 4. Inside airbag 2, cylindrical gas generator 1 is secured to holder 4 by clamp 4b. Holder 4 can be in the form of a pan, simultaneously securing gas generator 1 longitudinally. Above and to the right of gas generator 1 is the folded-together section 2c of airbag 2.

Figure 4:
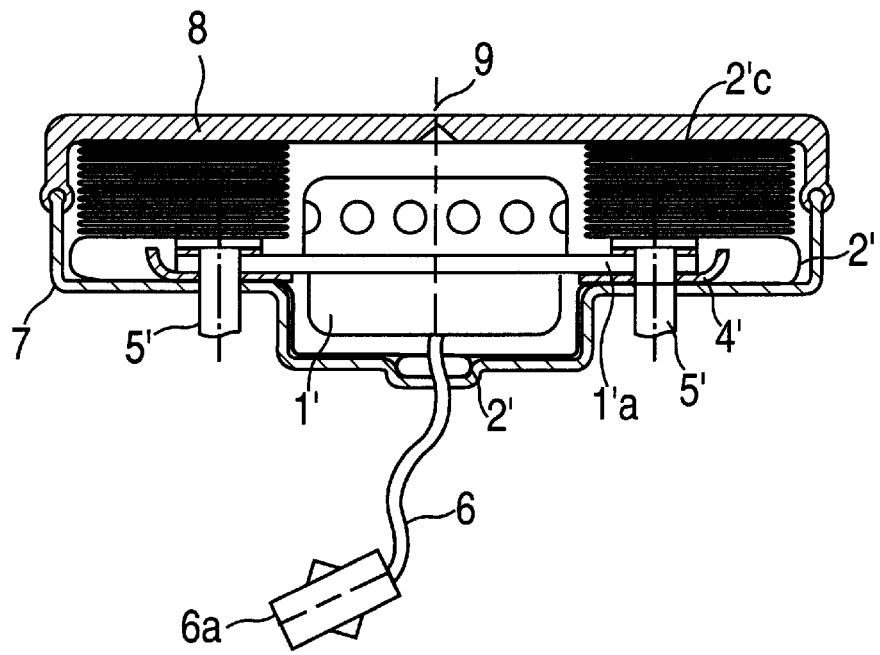

The gas generator 1' in the embodiment illustrated in FIG. 4 is in the form of a pot and has a flange 1'a. A holder 4' is accommodated along with a gas generator 1' inside airbag 2', which is closed along the edge. All that extends out of airbag 2' is a ignition line 6 with a plug 6a. The airbag module in this embodiment comprises gas generator 1' and airbag 2' and is accommodated in a housing 7. Housing 7 has a lid 8 that is fastened to it with screws 5' and can burst off. Gas generator 1', airbag 2', and housing 7 are provided with mutually aligned holes. Screws 5' can also be exploited to fasten the module comprising housing 7 and lid 8 to the inside of a vehicle. Burst-off lid 8 is clipped to the edge of housing 7 and provided with a score 9, along which it separates when the airbag is ignited. Holder 4' is bent at the edge a quarter circle around the folded-together airbag 2'c to prevent damage to the airbag when it inflates rapidly.

Figure 5:
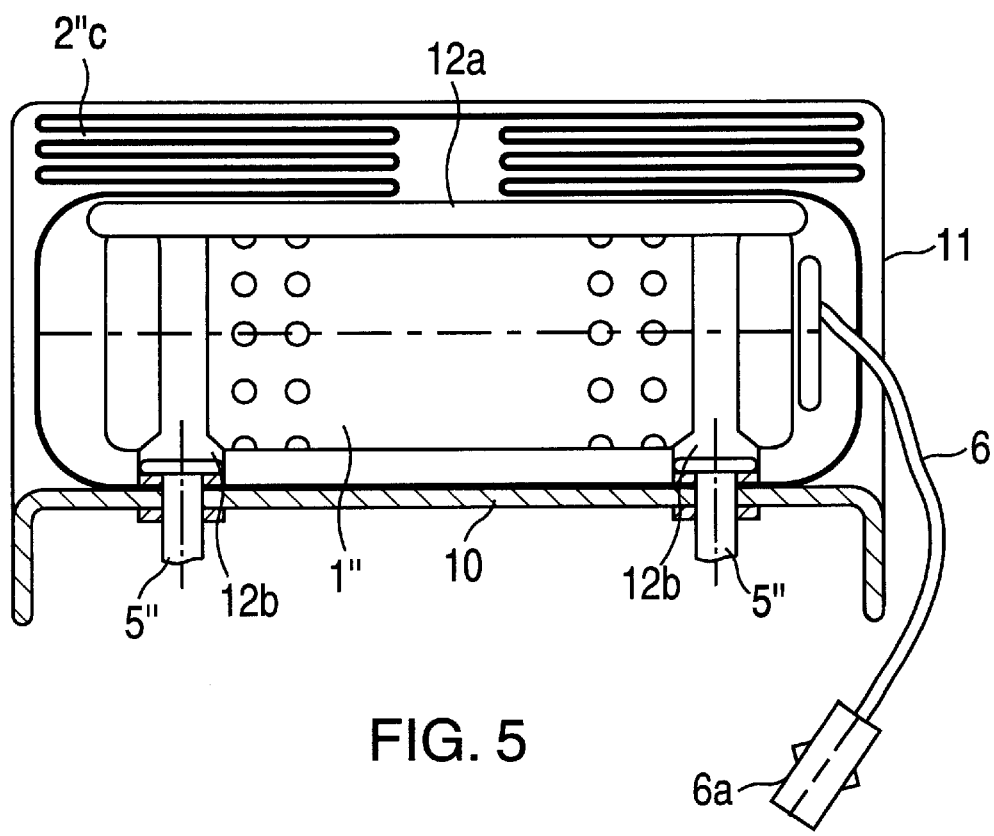

The embodiment illustrated in FIG. 5 has means of connecting an airbag 2" to a gas generator 1" and of fastening them both to the inside of a vehicle both inside and outside the airbag. Inside airbag 2", which is closed all the way around, cylindrical gas generator 1" is secured in a holder 12 similar to a clip and comprising a pan-shaped bottom 12a and two other components 12b. All that extends out is an ignition line 6 with a plug 6a. Components 12b and airbag 2" again have mutually aligned holes that can accommodate screws 5" or similar fasteners to fasten the airbag module to an exterior mounting plate 10 or to the inside of a vehicle. Mounting plate 10 can either be integrated into the module or can be a separate mounting accessory. The module can be conventionally protected with an outer cover 11 secured to the integrated mounting plate 10, creating a totally enclosed and independent assembly.

What is claimed is:

1. A device including a gas generator and an airbag for protecting passengers in the event of an accident, said airbag consisting of a folded single blank having superimposed edges and wherein said airbag is essentially closed all the way around by a single seam along the superimposed edges to form a hollow space and superimposed ends of the airbag, wherein the gas generator is accommodated in the hollow space of the airbag, wherein a sheet-metal holder for the gas generator is accommodated entirely inside the airbag and is fastened to the gas generator and has a flange disposed between the superimposed ends of the airbag, and wherein the flange and the superimposed ends of the airbag have at least two mutually aligned holes for accommodating fasteners.

2. The device as in claim 1, wherein the holder is secured in place inside the airbag by the holes and by the seam that extends along the edge.

3. The device as in claim 1, wherein the gas generator is essentially cylindrical, wherein the holder partly surrounds and secures said gas generator axially, and wherein said gas generator is connected to the holder by a clamp.

* * * * *